United States Patent

Burke et al.

Patent Number: 6,131,794
Date of Patent: Oct. 17, 2000

[54] SHAVING BLADE FOR CHIP SITE DRESSING

[75] Inventors: Jac Anders Burke, Lake Katrine; David Charles Olson, Poughkeepsie; James Edward Tersigni, Castleton; Jeffrey Scott Wolfe, Hopewell Jct, all of N.Y.

[73] Assignee: International Business Machines, Corp., Armonk, N.Y.

[21] Appl. No.: 08/872,951

[22] Filed: Jun. 11, 1997

Related U.S. Application Data

[62] Division of application No. 09/266,659, Mar. 11, 1999.

[51] Int. Cl.[7] .............................. B23K 5/22; B23K 1/018; B26D 3/02
[52] U.S. Cl. ........................ 228/20.1; 228/20.5; 228/191; 83/869
[58] Field of Search ........................... 228/19, 20.1, 191, 228/264, 119, 20.5; 83/100, 861, 869; 29/829

[56] References Cited

U.S. PATENT DOCUMENTS

| | | | |
|---|---|---|---|
| 3,840,978 | 10/1974 | Lynch et al. | 29/243 |
| 4,023,724 | 5/1977 | Wakita et al. | 228/20 |
| 4,152,172 | 5/1979 | Jensen et al. | 134/6 |
| 4,187,972 | 2/1980 | Vella | 228/20 |
| 4,768,698 | 9/1988 | Brown et al. | 228/264 |
| 4,771,932 | 9/1988 | Kim | 228/180.1 |
| 4,896,019 | 1/1990 | Hyun | 219/228 |
| 4,914,995 | 4/1990 | Osborn | 83/100 |
| 4,954,453 | 9/1990 | Venutolo | 437/8 |
| 5,145,099 | 9/1992 | Wood et al. | 228/9 |
| 5,216,803 | 6/1993 | Nolan et al. | 29/829 |
| 5,280,668 | 1/1994 | Fortune | 15/415.1 |
| 5,375,318 | 12/1994 | Catalano | 29/762 |
| 5,429,460 | 7/1995 | Campian | 409/137 |
| 5,478,009 | 12/1995 | Interrante et al. | 228/264 |
| 5,854,805 | 12/1998 | Reid et al. | 372/70 |

OTHER PUBLICATIONS

R.D. McNutt and K. Schink. "Chip Removal and Chip Site Dressing" IBM Tech. Dis. Bull. pp. 1288–1289, Jul. 1981.

Metals Handbook 9th ed. vol. 3, 1980.

Metals Handbook, 9th ed. vol. 3, pp. 421–422, 461–462, 1980.

K.J. Puttlitz, "An Overview of Flip–Chip Replacement Tchnology On MLC Mutlichip Modules", The International Journal of Microcircuits and Electronic Packaging, vol. 15, No. 3, pp. 113–126 (1992).

*Primary Examiner*—Patrick Ryan
*Assistant Examiner*—Kiley Stoner
*Attorney, Agent, or Firm*—Scully, Scott, Murphy & Presser; Aziz M. Ahasn, Esq.

[57] ABSTRACT

A shaving or shearing blade utilized in dressing solder joint chip technologies without the use of heat or a copper block wicking process. In essence, any solder debris resulting from the solder shaving process as implemented by the shaving blade is removed through the intermediary of a vacuum arrangement located as an integral structure in the shaving blade so as to inhibit the potential formation of electrical shorts or causing solder damage in subsequent replacement chip joins or other assembly operations.

10 Claims, 1 Drawing Sheet

SHAVING BLADE FOR CHIP SITE DRESSING

This application is a division of 09/266,659 filed Mar. 11, 1999.

BACKGROUND OF THE INVENTION

1. Field of the Invention

The present invention relates to a shaving or shearing blade utilized in dressing sites in solder joint chip technologies by removing excess solder without the use of heat or a copper block wicking process; to a method of implementing the dressing procedure, and to the use of the shaving or shearing blade. In essence, any solder debris resulting from the solder shaving process as implemented by the shaving or shearing blade is removed through the intermediary of a vacuum arrangement which is located as an integral structure in the shaving blade so as to inhibit the potential formation of electrical shorts or causing solder damage in subsequent replacement chip joins or other assembly operations.

The techniques of removing components from multichip modules, including thermal conduction modules and the like, have been well developed in the technology. Although several methods for removing components are currently in existence, site dress utilizing the wicking action of a copper block has always been employed in order to remove excess solder so as to enable a new component to be placed on the site. However, when joining the component to a new chip site, the contact non-wet failure rate is quite considerable. Copper block site dress processes are also involved in their implementation and somewhat difficult to implement. Thus, once a component is removed from the multichip module, the component must be inspected for any bottom layer metallurgy tear-out or similar condition because a copper block will not properly dress the site held up by any debris, such as particles or other debris caused by solder removal. The copper block(s) is normally located on the site and is heated to reflow temperatures to wick any excess solder. The copper block frequently requires a time-consuming cleaning action prior to reuse. The copper block can be expensive to produce and pre-tinning and flux may be required.

Much of the currently available component-replacement technology, surface mount (SMT) and pin-in-hole (PIH) is not directly extendable to replacing individual area-array solder ball flip chips (SBFC) on multichip modules. Flip-chip replacement offers some unique challenges in addition to those encountered in the removing SMT or PIH components. In general, SBFC require a more sophisticated replacement technology capable of tight parametric control. Conventional chip attachments, in essence, such as wire bond or tape automated bonds (TAB), do not readily lend themselves to chip replacement, although some progress has been recently made in this technology.

2. Discussion of the Prior Art

Several chip removal and ref lux-techniques and their attributes have been presented and extensively discussed in an article entitled "An Overview of Flip-chip Replacement Technology on MLC Multichip Modules"; The International Journal of Microcircuits and Electronic Packaging; Volume 15, Number 3, Third Quarter 1992; pages 113–126. Flip-chip replacement can be tailored to satisfy specific conditions and situations. For example, removal may be achieved by mechanical means such as by the application of torques or ultrasound, or with the aid of a suitable heat source or sources, as described in the above-reference article. Mechanical methods are preferred, being both simple and capable of higher throughput. However, constraints such as proximity to other surface features, chip footprint, or the like, often dictate the replacement methods. Also considered have been module constraints such as anisotropic thermal conductivity, mass, etc. and their effects. It will be demonstrated that with the present invention, even under difficult conditions; for instance, high degree of constraints, flip-chips can be individually removed and rejoined successfully.

After chip removal, residual solder left on substrate pads is removed. This procedure prevents shorts between adjacent pads due to solder accumulation at sites which experience multiple replacements. So-called site dressing is also necessary to assure joint integrity by maintaining a solder volume which optimizes thermal fatigue life.

Various methods and tools have been utilized in the technology to dress sites or otherwise treat locations to remove debris or the like.

Nolan et al. U.S. Pat. No. 5,216,803 discloses the removal of remnant wire bonds from tape automated bonded (TAB) chips, and as such does not address specific requirements encountered in the removal of residual solder on various sites; for example, such as so-called C4 or controlled collapse chip connections which are the frequent interconnections of individual area array solder ball flip chips (SBFC) located on multichip modules.

Venutolo U.S. Pat. No. 4,954,453 discloses a chip removal method utilizing heat in order to break the solder interconnect at a uniform height. However, the patent does not address itself to the removal of residual solder or debris following the removal operation for a chip.

Brown et al. U.S. Pat. No. 4,768,698 discloses an X-Y table providing a quick shear option which is adapted to remove components from printed circuit boards which have been heated through the intermediary of a hot air nozzle.

Jensen et al. U.S. Pat. No. 4,152,172 discloses the vinyl scrubbing of input/output terminals of semiconductor elements of a semiconductor wafer for the removal of oxides.

SUMMARY OF THE INVENTION

Accordingly, it is a purpose of the present invention to provide a novel shaving or shearing blade of a particularly unique design, in which the blade is preferably constituted of pre-hardened, cobalt-impregnated high-speed tool steel, and which possesses a unitary shaving or shearing tip with an integral vacuum arrangement. The vacuum generated at the blade tip is implemented to aspirate solder debris produced during the shaving process so as to prevent any solder debris from falling on the substrate surface during the shaving procedure, and with the blade being machined so that the tip thereof can be positioned on the chip site without causing damage to other devices or top surface wiring. Moreover, the angle of the blade and width from side to side or front to back can be readily modified to operate with different top surface architectures of multichip modules.

In accordance with the invention, the novel shaving or shearing blade can be readily mounted on an apparatus providing for an extremely accurate X, Y and Z coordinate positioning and movement thereof through either the use of a servo system or manual controls, and may optionally be imparted a rotational motion. The plane of the substrate may be located by simply touching off on three points, then relating the plane to the shaving blade and enabling shaving or shearing the site to within a close tolerance of the substrate surface. The product thus possesses extremely little residual solder and does not require any wicking with a copper block or other solder wicking devices, and also does not necessitate the application of any heat to reflow temperatures for vacuum reflow systems. Inasmuch as the multiple interconnections are planar and possess a known amount of solder, another component can be reliably positioned on the vacant site. The mechanism is rendered by the shaving blade to have the ability to be moved across a site at a preset speed, and any mount housing the shaving blade is adapted to be adjustable both horizontally and perpendicularly. Depending upon the product type to be processed, the ability to accurately control the height of the shaving blade is critical to the quality and performance of the shave, and the tool may be equipped with optics which can be angled to observe the site being shaved during processing.

Accordingly, it is another purpose of the present invention to provide a novel shaving or shearing blade of a specified material for removing solder debris from multichip modules from which components have been removed.

A further purpose of the invention is to provide a shaving or shearing blade of the type described possessing an integral vacuum arrangement which is connectable to a source of vacuum so as to concurrently aspirate any solder debris formed at a site during the solder procedure of being shaved by the tip of the blade, and to a method of utilizing the inventive shaving or shearing blade.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

DETAILED DESCRIPTION OF A PREFERRED EMBODIMENT

Figure 1:
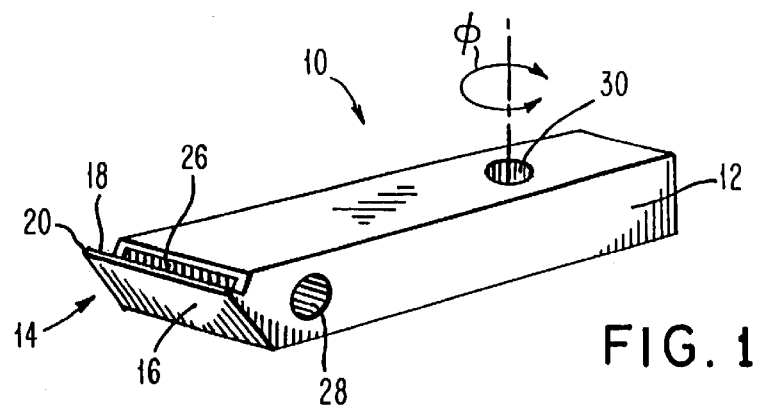
FIG. 1, illustrates a perspective view of the shaving or shearing blade pursuant to the invention.
Figure 2:
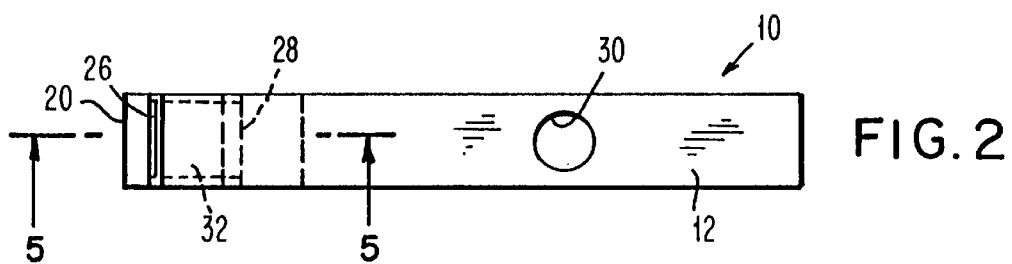
FIG. 2, illustrates a top plan view of the blade of FIG. 1.
Figure 3:
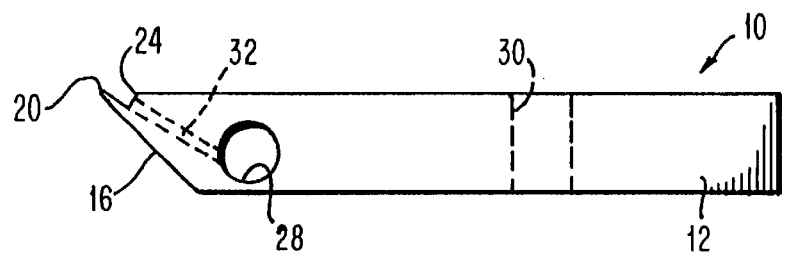
FIG. 3, illustrates a side view of the blade of FIG. 1.
Figure 4:
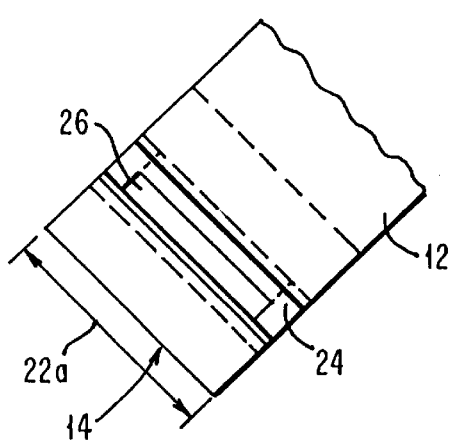
FIG. 4, illustrates, on an enlarged scale, a plan view of the tip portion of the shaving blade.
Figure 5:
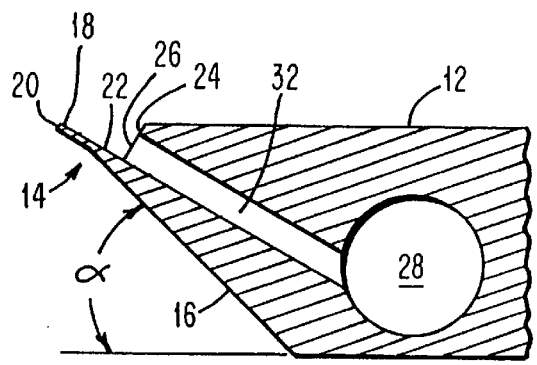
FIG. 5, illustrates, on an enlarged scale, a cross-sectional view of the tip portion of the blade taken along line 5—5 in FIG. 2.

Referring more specifically to the drawings, the shaving or shearing blade 10 is essentially constituted of an elongate body or element 12 of preferably essentially rectangular cross-section, although a circular cross-section or other configuration may also be employed. A front end 14 of element 12 is angled forwardly and upwardly to provide a planar surface 16 which is at a predetermined angle a relative to the longitudinal axis or extent of elongate element or body 12, and which forms a shaving or shearing surface. The angle α may be within the range of about 30–60°, and as shown, preferably 45°, although other angles may be suitably employed pursuant to specific applications. The shaving tip portion 18 of the front end 14 of the blade is tapered towards a point or thin edge 20, and has a width 22a which extends substantially across the entire width of front end 14 so as to form a wedge-like straight shaving or shearing chisel edge adapted to smoothly shave solder as mentioned hereinbefore. At the rearward upper end of the shaving tip portion 18, extending from the upper surface 22 thereof is an upwardly and rearwardly angled transverse planar surface 24 extending across the width of the blade 10. A slotted aperture 26 in surface 24 which is in alignment with tip upper surface 22 communicates with an internal channel 32 formed in element 12, and which connects with a transverse bore 28 to which there may be connected suitable hoses or other connecting devices (not shown) leading to a suctioning device for imparting a vacuum to the shaving tip portion 18 of the blade 10.

Further through-apertures 30 may be formed to extend through the elongate body 12 of the blade so as to enable mounting thereof to a suitable apparatus imparting predetermined X-Y and Z motion thereto, and possibly rotation about an angle Ø, as is well known in the technology. Such apparatus may also incorporate optical means (not shown) which is adapted to be attached to the blade device to facilitate observation of the surface being shaved by the blade device.

Preferably, the construction of the shaving blade 10, which is of an integral or single-piece structure may be constituted of a pre-hardened cobalt-impregnated high-speed tool steel. The blade is designed to be easily positioned on a chip site without causing damage to other devices, and due to its material composition may be readily reworked, and is thereby adapted to be reconditioned and utilized a considerable number of time before being worn out and discarded so as to be highly economical.

Moreover, the blade 10 may be designed to possess differing widths and tip angles besides that illustrated so as to be adaptable to different types of multichip modules for the removal of solder debris and the like. For example, in addition to shaving and vacuuming solder at the above-mentioned C4 interconnected components, the blade may be employed on any module possessing thin film metallurgy. The blade can also be conceivably employed by a user having a requirement to remove a hermetic solder seal band for multichip modules; for the removal of wire bond interconnections such as for known good dies (KGD); for discrete surface mounted device removal; for the direct attachment of components on board with a requirement to remove and dress sites; or for any user intending to remove any adhesive from the side of die-bonded chips.

From the foregoing, it becomes readily apparent that the inventive shaving or shearing blade which incorporates an integral vacuum arrangement for aspirating or suctioning solder debris or the like concurrently with the shaving operation is adapted for many diverse applications so as to render the process of chip removal and site dress inexpensive and easily accomplished in this and other related technologies.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Having thus described our invention, what we claim as new, and desire to secure by Letters Patent is:

1. A blade device for shaving or shearing material from a surface, comprising an elongated member adapted to be displaced over said surface in predetermined directions and orientations, a leading end of said elongated member forming a shaving tip portion for shaving material from said surface, said blade tip portion having a wedge-shaped cross-section forming a thin leading edge extending transversely of the longitudinal extent of said elongated member, and vacuum suctioning means integral with said blade device for suctioning material debris from said surface concurrently with said shaving tip portion shaving said material from said surface, said vacuum suctioning means comprising a passageway formed in said elongated member, said passageway having a first end terminating proximate said blade tip portion and an opposite end communicating with a bore formed in said elongated member for connection with a source of vacuum, said passageway having an elongated cross-section across a substantial portion of the width of said elongated member, the upper surface of said wedge-shaped leading edge having a setback upstanding wall at a rearward end thereof, said first end of said passageway terminating in said upstanding wall.

2. A blade device as claimed in claim 1, wherein said shaving tip portion of said blade device is angled upwardly and forwardly of the longitudinal extent of said elongated member.

3. A blade device as claimed in claim 2, wherein said upwardly angled tip portion subtends an angle within the range of about 30 to 60° with the longitudinal extent of said elongated member.

4. A blade device as claimed in claim 3, wherein said angle is about 45°.

5. A blade device as claimed in claim 1, wherein said elongated member is rectangular in transverse cross-section.

6. A blade device as claimed in claim 1, wherein said blade device is constituted of a cobalt-impregnated, pre-hardened high-speed tool steel.

7. A blade device as claimed in claim 1, wherein said blade device is adapted to shave solder from a surface, and said vacuum means concurrently suctions solder debris from said surface.

8. A blade device as claimed in claim 1, wherein optical means are adapted to be attached to said blade to facilitate observation of the surface during shaving thereof.

9. A blade device as claimed in claim 7, wherein said blade device is adapted to remove solder-blade flip-chip, solder balls, and solder columns.

10. A blade device as claimed in claim 7, wherein said blade device is adapted for the removal of wire bond interconnections; for the removal of hermetic solder seal bands; and for the removal of solder seal pads.

* * * * *

UNITED STATES PATENT AND TRADEMARK OFFICE
CERTIFICATE OF CORRECTION

PATENT NO. : 6,131,794
DATED : October 17, 2000
INVENTOR(S) : J.A. Burke, et al.

It is certified that error appears in the above-identified patent and that said Letters Patent is hereby corrected as shown below:

Title page,
After item [22], delete -- Related U.S. Application Data, [62] Division of application No. 09/266,659, Mar. 11, 1999. --

Title page,
Item [56] References Cited, OTHER PUBLICATIONS: "Tchnology" should read -- Technology --

Title page,
Item [56] References Cited, OTHER PUBLICATIONS: "Mutlichip" should read -- Multichip --

Column 1,
Line 57, "ref lux" should read -- reflux --

Signed and Sealed this

Sixteenth Day of October, 2001

Attest:

NICHOLAS P. GODICI
Attesting Officer
Acting Director of the United States Patent and Trademark Office